US011975512B2

(12) United States Patent
Effler, Jr. et al.

(10) Patent No.: US 11,975,512 B2
(45) Date of Patent: May 7, 2024

(54) MULTILAYER FILMS AND ARTICLES COMPRISING MULTILAYER FILMS

(71) Applicant: Dow Global Technologies LLC, Midland, MI (US)

(72) Inventors: Lawrence J. Effler, Jr., Rosharon, TX (US); Teresa P. Karjala, Lake Jackson, TX (US); Nermeen W. Aboelella, Pearland, TX (US); Nicolas C. Mazzola, Pearland, TX (US); Vivek Kalihari, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/754,156

(22) PCT Filed: Oct. 6, 2020

(86) PCT No.: PCT/US2020/054398
§ 371 (c)(1),
(2) Date: Mar. 25, 2022

(87) PCT Pub. No.: WO2021/076357
PCT Pub. Date: Apr. 22, 2021

(65) Prior Publication Data
US 2022/0288901 A1 Sep. 15, 2022

Related U.S. Application Data

(60) Provisional application No. 62/916,359, filed on Oct. 17, 2019.

(51) Int. Cl.
*B32B 27/08* (2006.01)
*B32B 27/20* (2006.01)
*B32B 27/30* (2006.01)
*B32B 27/32* (2006.01)
*B32B 27/34* (2006.01)

(52) U.S. Cl.
CPC ............. *B32B 27/08* (2013.01); *B32B 27/20* (2013.01); *B32B 27/306* (2013.01); *B32B 27/32* (2013.01); *B32B 27/34* (2013.01); *B32B 2250/05* (2013.01); *B32B 2250/24* (2013.01); *B32B 2270/00* (2013.01); *B32B 2307/30* (2013.01); *B32B 2307/406* (2013.01); *B32B 2307/41* (2013.01); *B32B 2307/558* (2013.01); *B32B 2307/72* (2013.01); *B32B 2307/7244* (2013.01); *B32B 2307/7246* (2013.01); *B32B 2307/732* (2013.01)

(58) Field of Classification Search
CPC ............ B32B 2250/05; B32B 2250/24; B32B 2250/242; B32B 2270/00; B32B 2307/30; B32B 2307/406; B32B 2307/41; B32B 2307/412; B32B 2307/54; B32B 2307/558; B32B 2307/72; B32B 2307/7244; B32B 2307/7246; B32B 2307/732; B32B 2307/746; B32B 2439/06; B32B 2439/46; B32B 2439/70; B32B 27/08; B32B 27/20; B32B 27/306; B32B 27/32; B32B 27/34
See application file for complete search history.

(56) References Cited

U.S. PATENT DOCUMENTS

| 4,705,714 A | 11/1987 | Itaba et al. |
| 2008/0287634 A1 | 11/2008 | Nieto et al. |
| 2016/0177073 A1 | 6/2016 | Demirors et al. |
| 2016/0237263 A1 | 8/2016 | Tsuruta et al. |
| 2019/0002602 A1 | 1/2019 | Patel et al. |
| 2019/0169385 A1 | 6/2019 | Bilgen et al. |

FOREIGN PATENT DOCUMENTS

EP 1275664 A1 1/2003

OTHER PUBLICATIONS

Krohn, "Factors Affecting the Permeability of PE Blown Films".
Todd, "Variables That Affect/Control High Density Polyethylene Film Oxygen/Moisture Barrier", ANTEC (2003).
McLeod, J. Plast. Film & Sheeting, 2004, vol. 20, p. 261.
Yan, et al., Polymer 40, 1999, pp. 1737-1744.
PCT/US2020/054398, International Search Report and Written Opinion dated Jan. 25, 2021.
Zhigang, "Flexible Plastic Packaging Materials", Cultural Development Press, 2018, vol. 1, pp. 1, 2, and 141.

*Primary Examiner* — Lawrence D Ferguson
(74) *Attorney, Agent, or Firm* — Jacob Graham

(57) ABSTRACT

Embodiments of the present invention relate to multilayer films and articles. In one aspect, a multilayer film comprises at least one outer layer comprising at least 50 wt % of a polyethylene composition comprising the reaction product of ethylene and optionally, one or more alpha-olefin comonomers, wherein the polyethylene composition is characterized by the following properties: a. a melt index, $I_2$, of from 0.3 to 3.0 g/10 min; b. a density of from 0.950 to 0.965 g/cm$^3$; c. a melt flow ratio, $I_{10}/I_2$, of from 6.3 to 7.5; and d. a molecular weight distribution (MWD) of from 2.2 to 3.5, wherein the multilayer film has a thickness of at least 2 mils, wherein the multilayer film comprises at least 50% by weight polyethylene, wherein the multilayer film exhibits a surface haze of 13.5% or less when measured according to ASTM 1003-07, and wherein the multilayer film exhibit a water vapor transmission rate of 0.7 g/mil/100 in$^2$/day or less when measured according to ASTM F1249-06 at a temperature of 38° C. and a relative humidity of 100%.

11 Claims, No Drawings

MULTILAYER FILMS AND ARTICLES COMPRISING MULTILAYER FILMS

FIELD

This disclosure relates to multilayer films and to articles comprising multilayer films.

INTRODUCTION

Polyethylene films are widely used in packaging, such as, for example, shrink films, bag applications, laminates, pouches, and protective films. In some instances, the polyethylene films may have high total haze values, such as, above 30% for a multilayer blown film. Such high haze values may limit the ability of those films to be used in clear film applications, such as, bags with see-through windows, surface protection films with see-through optics, and high optics shrink films.

In addition for some applications, it is also important to have good mechanical properties (e.g., stiffness or modulus for stand-up pouches) and/or low water vapor transmission rates (e.g., applications where barrier properties are important).

There remains a need for new multilayer films that can provide a desirable balance of optical, mechanical, and/or barrier properties.

SUMMARY

The present invention provides multilayer films that, in some embodiments, have desirable optical, mechanical, and/or barrier properties. In some embodiments, multilayer films of the present invention have particularly low surface haze values. In some embodiments, multilayer films of the present invention have particularly low surface haze values while maintaining desirable mechanical properties. Multilayer films, according to some embodiments of the present invention, have particularly low surface haze and/or total haze values while providing desirable water vapor barrier properties.

In one aspect, the present invention provides a multilayer film that comprises at least one outer layer comprising at least 50 wt % of a polyethylene composition comprising the reaction product of ethylene and optionally, one or more alpha-olefin comonomers, wherein the polyethylene composition is characterized by the following properties:

a. a melt index, $I_2$, of from 0.3 to 3.0 g/10 min;
b. a density of from 0.950 to 0.965 g/cm$^3$;
c. a melt flow ratio, $I_{10}/I_2$, of from 6.3 to 7.5; and
d. a molecular weight distribution (MWD) of from 2.2 to 3.5, wherein the multilayer film has a thickness of at least 2 mils, wherein the multilayer film comprises at least 50% by weight polyethylene, wherein the multilayer film exhibits a surface haze of 13.5% or less when measured according to ASTM 1003-07, and wherein the multilayer film exhibits a water vapor transmission rate of 0.7 g-mil/100 in$^2$/day or less when measured according to ASTM F1249-06 at a temperature of 38° C. and a relative humidity of 100%.

In one aspect, the present invention provides a multilayer film that comprises at least one outer layer comprising at least 50 wt % of a polyethylene composition comprising the reaction product of ethylene and optionally, one or more alpha-olefin comonomers, wherein the polyethylene composition is characterized by the following properties:

a. a melt index, $I_2$, of from 0.3 to 3.0 g/10 min;
b. a density of from 0.950 to 0.965 g/cm$^3$;
c. a melt flow ratio, $I_{10}/I_2$, of from 6.3 to 7.5; and
d. a molecular weight distribution (MWD) of from 2.2 to 3.5, wherein the multilayer film has a thickness of at least 2 mils, wherein the multilayer film comprises at least 90% by weight polyethylene, wherein the multilayer film exhibits a surface haze of 13.5% or less when measured according to ASTM 1003-07, wherein the multilayer film exhibits a water vapor transmission rate of 0.5 g-mil/100 in$^2$/day or less when measured according to ASTM F-1249-06 at a temperature of 38° C. and a relative humidity of 100%, and wherein the total amount of ethylene vinyl alcohol copolymer and polyamide in the multilayer film is less than 0.5 weight percent based on the total weight of the film.

In one aspect, the present invention provides a multilayer film that comprises at least one outer layer comprising at least 50 wt % of a polyethylene composition comprising the reaction product of ethylene and optionally, one or more alpha-olefin comonomers, wherein the polyethylene composition is characterized by the following properties:

a. a melt index, $I_2$, of from 0.3 to 3.0 g/10 min;
b. a density of from 0.950 to 0.965 g/cm$^3$;
c. a melt flow ratio, $I_{10}/I_2$, of from 6.3 to 7.5; and
d. a molecular weight distribution (MWD) of from 2.2 to 3.5, wherein the multilayer film has a thickness of at least 2 mils, wherein the multilayer film comprises at least 90% by weight polyethylene, wherein the multilayer film exhibits a total haze of 30% or less when measured according to ASTM 1003-07, wherein the multilayer film exhibits a water vapor transmission rate of 0.5 g-mil/100 in$^2$/day or less when measured according to ASTM F-1249-06 at a temperature of 38° C. and a relative humidity of 100%, and wherein the total amount of ethylene vinyl alcohol copolymer and polyamide in the multilayer film is less than 0.5 weight percent based on the total weight of the film.

As discussed below, the present invention also provides articles formed from any of the inventive multilayer films disclosed herein.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers, ethylene/α-olefin interpolymers, and ethylene/α-olefin copolymers. Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); High Density Polyethylene (HDPE); Enhanced Polyethylene; polyethylene elastomers; and polyethylene plastomers. These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. Nos. 8,916,667, 8,871,887, 8,822,601, 9,228,036, and 9,765,160 which are hereby incorporated by reference). LDPE resins typically have a density in the range of 0.916 to 0.935 $g/cm^3$.

The term "LLDPE", includes both resin made using the traditional Ziegler-Natta catalyst systems and chromium-based catalyst systems as well as single-site catalysts, including, but not limited to, bis-metallocene catalysts (sometimes referred to as "m-LLDPE"), constrained geometry catalysts (CGC), and molecular catalysts. Resins include linear, substantially linear, or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.940 $g/cm^3$. "MDPE" is typically made using chromium or Ziegler-Natta catalysts or using single-site catalysts including, but not limited to, bis-metallocene catalysts, constrained geometry catalysts, and molecular catalysts, and typically have a molecular weight distribution ("MWD") greater than 2.5.

The term "HDPE" refers to polyethylenes having densities greater than about 0.940 $g/cm^3$ and up to about 0.970 $g/cm^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 $g/cm^3$, which are generally prepared with Ziegler-Natta catalysts, chrome catalysts, or single-site catalysts including, but not limited to, bis-metallocene catalysts and constrained geometry catalysts.

"Polyethylene plastomers/elastomers" are substantially linear, or linear, ethylene/α-olefin copolymers containing homogeneous short-chain branching distributions comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Polyethylene plastomers/elastomers have a density from 0.870 $g/cm^3$, or 0.880 $g/cm^3$, or 0.890 $g/cm^3$ to 0.900 $g/cm^3$, or 0.902 $g/cm^3$, or 0.904 $g/cm^3$, or 0.909 $g/cm^3$, or 0.910 $g/cm^3$, or 0.917 $g/cm^3$. Nonlimiting examples of polyethylene plastomers/elastomers include AFFINITY™ plastomers and elastomers (available from The Dow Chemical Company), EXACT Plastomers (available from ExxonMobil Chemical), Tafmer (available from Mitsui), Nexlene™ (available from SK Chemicals Co.), and Lucene (available LG Chem Ltd.).

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

In one aspect, the present invention provides a multilayer film that comprises at least one outer layer comprising at least 50 wt % of a polyethylene composition comprising the reaction product of ethylene and optionally, one or more alpha-olefin comonomers, wherein the polyethylene composition is characterized by the following properties:
  a. a melt index, I$_2$, of from 0.3 to 3.0 g/10 min;
  b. a density of from 0.950 to 0.965 g/cm$^3$;
  c. a melt flow ratio, I$_{10}$/I$_2$, of from 6.3 to 7.5; and
  d. a molecular weight distribution (MWD) of from 2.2 to 3.5, wherein the multilayer film has a thickness of at least 2 mils, wherein the multilayer film comprises at least 50% by weight polyethylene, wherein the multilayer film exhibits a surface haze of 13.5% or less when measured according to ASTM 1003-07, and wherein the multilayer film exhibit a water vapor transmission rate of 0.7 g-mil/100 in$^2$/day or less when measured according to ASTM F1249-06 at a temperature of 38° C. and a relative humidity of 100%. In some embodiments, the melt index (I$_2$) of the polyethylene composition is from 0.5 to 2.5 g/10 minutes and in other embodiments, from 1.0 to 2.0 g/10 minutes. In some embodiments, the density of the polyethylene composition is from 0.950 to 0.960 g/cm$^3$ and in other embodiments, from 0.952 to 0.958 g/cm$^3$. In some embodiments, the multilayer film has a thickness of at least 3 mils and in other embodiments, up to 5 mils.

In some embodiments, the multilayer film further comprises an inner layer, and the inner layer comprises ethylene vinyl alcohol copolymer or polyamide. In some embodiments, the multilayer film comprises 30 weight percent or less ethylene vinyl alcohol copolymer and polyamide based on the total weight of the multilayer film. The multilayer film, in some embodiments, comprises less than 5% by weight ethylene vinyl alcohol copolymer and polyamide.

In another embodiment, a multilayer film of the present invention comprises at least one outer layer comprising at least 50 wt % of a polyethylene composition comprising the reaction product of ethylene and optionally, one or more alpha-olefin comonomers, wherein the polyethylene composition is characterized by the following properties:
  a. a melt index, 12, of from 0.3 to 3.0 g/10 min;
  b. a density of from 0.950 to 0.965 g/cm$^3$;
  c. a melt flow ratio, I$_{10}$/I$_2$, of from 6.3 to 7.5; and
  d. a molecular weight distribution (MWD) of from 2.2 to 3.5, wherein the multilayer film has a thickness of at least 2 mils, wherein the multilayer film comprises at least 90% by weight polyethylene, wherein the multilayer film exhibits a surface haze of 13.5% or less when measured according to ASTM 1003-07, wherein the multilayer film exhibits a water vapor transmission rate of 0.5 g-mil/100 in$^2$/day or less when measured according to ASTM F-1249-06 at a temperature of 38° C. and a relative humidity of 100%, and wherein the total amount of ethylene vinyl alcohol copolymer and polyamide in the multilayer film is less than 0.5 weight percent based on the total weight of the film. The multilayer film, in some embodiments, is free of ethylene vinyl alcohol copolymer and polyamide.

In another embodiment, a multilayer film of the present invention comprises at least one outer layer comprising at least 50 wt % of a polyethylene composition comprising the reaction product of ethylene and optionally, one or more alpha-olefin comonomers, wherein the polyethylene composition is characterized by the following properties:
  a. a melt index, 12, of from 0.3 to 3.0 g/10 min;
  b. a density of from 0.950 to 0.965 g/cm$^3$;
  c. a melt flow ratio, I$_{10}$/I$_2$, of from 6.3 to 7.5; and
  d. a molecular weight distribution (MWD) of from 2.2 to 3.5, wherein the multilayer film has a thickness of at least 2 mils, wherein the multilayer film comprises at least 90% by weight polyethylene, wherein the multilayer film exhibits a total haze of 30% or less when measured according to ASTM 1003-07, wherein the multilayer film exhibits a water vapor transmission rate of 0.5 g-mil/100 in$^2$/day or less when measured according to ASTM F-1249-06 at a temperature of 38° C. and a relative humidity of 100%, and wherein the total amount of ethylene vinyl alcohol copolymer and polyamide in the multilayer film is less than 0.5 weight percent based on the total weight of the film. In some embodiments, the melt index (I$_2$) of the polyethylene composition is from 0.5 to 2.5 g/10 minutes and in other embodiments, from 1.0 to 2.0 g/10 minutes. In some embodiments, the density of the polyethylene composition is from 0.950 to 0.960 g/cm$^3$ and in other embodiments, from 0.952 to 0.958 g/cm$^3$. In some embodiments, the multilayer film has a thickness of at least 3 mils and in other embodiments, up to 5 mils.

The multilayer film, in some embodiments, comprises at least 95% by weight polyethylene. In some embodiments, the multilayer film comprises at least 15 weight percent of the polyethylene composition based on the total weight of the multilayer film.

In some embodiments, the polyethylene composition used in multilayer films of the present invention is formed in the presence of a catalyst composition comprising a multi-metallic procatalyst via solution polymerization in at least one reactor. The solution polymerization, in some such embodiments, occurs in a single reactor.

Some embodiments of the present invention relate to articles. An article according to embodiments of the present invention comprises a multilayer film according to any of the inventive embodiments disclosed herein. An article of the present invention can comprise a combination of two or more embodiments as described herein.

Polyethylene Composition

In embodiments herein, the multilayer film comprises an outer layer that comprises at least 50 wt % of a polyethylene composition described further herein. All individual values and subranges are included and disclosed herein. For example, the outer layer of the film may comprise from 50 to 100 percent, 55 to 100 percent, 60 to 100 percent, 65 to 100 percent, 70 to 100 percent, 75 to 100 percent, 80 to 100 percent, 85 to 100 percent, 90 to 100 percent, or 95 to 100 percent, based on the total weight of polymers present in the outer layer of the film, of the polyethylene composition.

The polyethylene composition comprises the reaction product of ethylene and, optionally, one or more alpha-olefin comonomers. The polyethylene composition comprises greater than 50 wt % of the units derived from ethylene and less than 30 wt % of the units derived from one or more alpha-olefin comonomers. In some embodiments, the polyethylene composition may be a homopolymer and comprise 100%, by weight, of the units derived from ethylene. In some embodiments, the polyethylene composition comprises (a) greater than or equal to 75%, greater than or equal to 90%, greater than or equal to 95%, greater than or equal to 99%, greater than or equal to 99.5%, by weight, of the units derived from ethylene; and (b) optionally, less than 25 percent, less than 10%, less than 5%, less than 1%, or less than 0.5%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene.

In the embodiments herein, the polyethylene composition is formed in the presence of a catalyst composition comprising a multi-metallic procatalyst via solution polymerization in at least one reactor. In one or more embodiments, the polyethylene composition is formed in the presence of a catalyst composition comprising a multi-metallic procatalyst comprising three or more transition metals via solution polymerization in at least one reactor. In some embodiments, the solution polymerization occurs in a single reactor. The multi-metallic procatalyst used in producing the reaction product is at least trimetallic, but may also include more than three transition metals, and thus may be defined more comprehensively as multi-metallic. These three, or more, transition metals are selected prior to production of the catalyst. In a particular embodiment, the multi-metal catalyst comprises titanium as one element.

The catalyst compositions may be prepared beginning first with preparation of a conditioned magnesium halide-based support. Preparation of a conditioned magnesium halide-based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.25 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., alternatively, 0° C. to 50° C.; a time ranging from 1 to 12 hours, alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. The conditioning compound has a molar ratio constitution that is specific and which is believed to be an important feature in ensuring the desirable catalyst performance. Specifically, the procatalyst desirably exhibits a molar ratio of the magnesium to the conditioning compound that ranges from 3:1 to 6:1. Without wishing to be bound by any theory of mechanism, it is suggested that this aging serves to facilitate or enhance adsorption of additional metals onto the support.

Once the conditioned support is prepared and suitably aged, it is brought into contact with a titanium compound which may be added individually or as a mixture with the "second metal". In certain preferred embodiments titanium halides or alkoxides, or combinations thereof, may be selected. Conditions may include a temperature within the range from 0° C. to 50° C., alternatively from 25° C. to 35° C.; a time from 3 hours to 24 hours, alternatively from 6 hours to 12 hours; or both. The result of this step is adsorption of at least a portion of the titanium compound onto the conditioned magnesium halide support.

Finally, one or two additional metals, referred to herein as "the second metal" and "the third metal" for convenience, will also be adsorbed onto the magnesium-based support. The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1. In some embodiments, the Al:Ti ratio is from 6 to 15, 7 to 14, 7 to 13, 8 to 13, 9 to 13, or 9 to 12.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

In embodiments described herein, the polyethylene composition may have a metal catalyst residual of greater than or equal to 1 parts by combined weight of at least three metal residues per one million parts of polyethylene polymer, wherein the at least three metal residues are selected from the group consisting of titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the polyethylene composition may further comprise greater than or equal to 2 parts by combined weight of at least three metal residues remaining from the multi-metallic polymerization catalyst per one million parts of the polyethylene composition.

In some embodiments, the polyethylene composition comprises at least 0.75 ppm of V (Vanadium). All individual values and subranges from at least 0.75 ppm of V are included and disclosed herein; for example the lower limit of the V in the polyethylene composition may be 0.75, 1, 1.1, 1.2, 1.3 or 1.4 ppm to an upper limit of the V in the polyethylene composition may be 5, 4, 3, 2, 1.9, 1.8, 1.7, 1.6, 1.5, or 1 ppm. The vanadium catalyst metal residual concentration for the polyethylene composition can be measured using the Neutron Activation Method for Metals described below.

In some embodiments, the polyethylene composition comprises at least 0.3 ppm of Zr (Zirconium). All individual values and subranges of at least 0.3 ppm of Zr are included and disclosed herein; for example the lower limit of the Zr in the polyethylene composition may be 0.3 0.4, 0.5, 0.6 or 0.7 ppm. In yet another embodiment, the upper limit of the Zr in the polyethylene composition may be 5, 4, 3, 2, 1, 0.9, 0.8 or 0.7 ppm. The zirconium catalyst metal residual concentration for the polyethylene composition can be measured using the Neutron Activation Method for Metals described below.

In one or more embodiments described herein, the polyethylene composition has a density of 0.950 g/cm$^3$ to 0.965 g/cm$^3$. All individual values and subranges of at least 0.950 g/cm$^3$ to 0.965 g/cm$^3$ are included and disclosed herein. For example, in some embodiments, the polyethylene composition may have a density ranging from a lower limit of 0.950, 0.952, 0.955, 0.956, or 0.957 g/cm$^3$ to an upper limit of 0.965, 0.963, 0.962, or 0.960 g/cm$^3$. In other embodiments, the polyethylene composition may have a density of 0.950 to 0.965 g/cm$^3$, 0.950 to 0.962 g/cm$^3$, 0.950 to 0.960 g/cm$^3$, 0.952 to 0.965 g/cm$^3$, 0.952 to 0.962 g/cm$^3$, 0.952 to 0.960 g/cm$^3$, or 0.952 to 0.958 g/cm$^3$.

In addition to the density, the polyethylene composition has a melt index, $I_2$, of 0.3 g/10 min to 3.0 g/10 min. All individual values and subranges of 0.3 g/10 min to 3.0 g/10 min are included and disclosed herein. For example, in some embodiments, the polyethylene composition may have melt index, $I_2$, ranging from a lower limit of 0.3, 0.4, 0.5, 0.6, 0.7, 0.8, or 0.9 to an upper limit of 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, or 0.9 g/10 min. In other embodiments, the polyethylene composition may have a melt index, $I_2$, of 0.5 g/10 min to 2.5 g/10 min. In further embodiments, the polyethylene composition may have a melt index, $I_2$, of 1.0 g/10 min to 2.0 g/10 min. Melt index, $I_2$, may be measured in accordance with ASTM D1238 (190° C. and 2.16 kg).

In addition to the density and melt index, $I_2$, the polyethylene composition has a melt flow ratio, $I_{10}/I_2$, of from 6.3 to 7.5. All individual values and subranges of from 6.3 to 7.5 are included and disclosed herein. For example, in some embodiments, the polyethylene composition may have a melt flow ratio, $I_{10}/I_2$, ranging from a lower limit of 6.3, 6.4, 6.5, 6.6, 6.7, 6.8, or 6.9 to an upper limit of 7.5, 7.4, 7.3, 7.2, 7.1, or 7.0. In other embodiments, the polyethylene composition may have a melt flow ratio, $I_{10}/I_2$, of from 6.3 to 7.3, 6.5 to 7.3, or 6.5 to 7.5. Melt index, $I_{10}$, may be measured in accordance with ASTM D1238 (190° C. and 10.0 kg).

In addition to the density, melt index, $I_2$, and melt flow ratio, $I_{10}/I_2$, the polyethylene composition has a molecular weight distribution (Mw/Mn) of from 2.2 to 3.5. All individual values and subranges of from 2.2 to 3.5 are included and disclosed herein. For example, the polyethylene composition may have a Mw/Mn ratio from a lower limit of 2.2, 2.3, 2.4, 2.5, 2.6, 2.7, or 2.8 to an upper limit of 3.5, 3.4, 3.3, 3.2, 3.1, 3.0, or 2.9. In some embodiments, the polyethylene composition may have an Mw/Mn ratio of from 2.2 to 3.5, 2.3 to 3.5, 2.4 to 3.5, 2.4 to 3.2, 2.5 to 3.2, or 2.6 to 3.1. In other embodiments, the polyethylene composition may have a Mw/Mn ratio of from 2.3 to 3.0, 2.4 to 3.0, 2.5 to 3.0, 2.6 to 3.0, or 2.7 to 3.0. Molecular weight distribution can be described as the ratio of weight average molecular weight ($M_w$) to number average molecular weight ($M_n$) (i.e., $M_w/M_n$), and can be measured by gel permeation chromatography techniques.

In addition to the density, melt index, $I_2$, melt flow ratio, $I_{10}/I_2$, and molecular weight distribution (Mw/Mn), the polyethylene composition may have a vinyl unsaturation of greater than 0.12 vinyls per one thousand carbon atoms ("1000C"). All individual values and subranges from greater than 0.12 vinyls per 1000 carbon atoms are included and disclosed herein. In some embodiments, the polyethylene composition may have greater than or equal to 0.13, 0.14, 0.15, or 0.16 vinyls per 1000 carbon atoms. In other embodiments, the polyethylene composition may have vinyls per 1000 carbon atoms ranging from a lower limit of greater than 0.12, 0.13, 0.14, 0.15, 0.16, or 0.17 to an upper limit of 0.50, 0.45, 0.40, 0.35, 0.30, 0.26, 0.25, 0.24, 0.23, 0.22, 0.21, or 0.20. In further embodiments, the polyethylene composition may have greater than 0.12 to 0.50, 0.13 to 0.45, 0.14 to 0.40, 0.14 to 0.35, 0.14 to 0.30, 0.14 to 0.25, or 0.15 to 0.22 vinyls per 1000 carbon atoms.

In some embodiments, the outer layer comprising the polyethylene composition described above may further comprise other polymers in addition to the polyethylene composition. For example, in some embodiments, in addition to the first composition described above, the first layer may further comprise LDPE, HDPE, MDPE, LLDPE, and polyolefin plastomers/elastomers. For example, LDPE can be included in the outer layer to facilitate processing. In some embodiments where LDPE is used in the outer layer, the outer layer can comprise 1 to less than 50 weight percent of LDPE based on the total weight of the outer layer. In some embodiments where LDPE is used in the outer layer, the outer layer can comprise 5 to 20 weight percent of LDPE based on the total weight of the outer layer. Examples of commercially available LDPE that can be used in some embodiments of the present invention include LDPE available from The Dow Chemical Company, such as AGILITY™ 1021. Examples of commercially available HDPE that can be used in some embodiments of the present invention include HDPE from The Dow Chemical Company, such as ELITE™ 5960G1 Enhanced Polyethylene Resin HDPE and Surpass HPs167 from Nova Chemicals Company. Examples of commercially available LLDPE that can be used in some embodiments of the present invention include LLDPE available from The Dow Chemical Company, such as ELITE™ 5400 G Enhanced Polyethylene Resin LLDPE and DOWLEX™ GM 8070G LLDPE. Examples of commercially available MDPE that can be used in some embodiments of the present invention include MDPE available from The Dow Chemical Company, such as ELITE™ 5940G Enhanced Polyethylene Resin MDPE and DOWLEX™ 2038.68G. Examples of commercially available polyolefin plastomers/elastomers that can be used in some embodiments of the present invention include polyolefin plastomers/elastomers available from The Dow Chemical Company, such as its AFFINITY™ polyolefin plastomers/elastomers.

Small amounts of other polymers can also be used in the outer layer in some embodiments. In some embodiments, such polymers can be provided in amounts of less than 5 weight percent.

The outer layer can be prepared from the components discussed above using techniques known to those of skill in the art based on the teachings herein. In some embodiments, the components of the outer layer can be melt blended and formed into pellets. Such pellets can then be provided to film converters for use in an outer layer in a multilayer film. In some embodiments, the components can be blended inline in an extruder or similar film forming apparatus to form an outer layer in a multilayer film.

In some embodiments, the multilayer film comprises at least 15 wt % of the polyethylene compositions disclosed herein (e.g., the Polyethylene Composition described above and IE1 and IE2 in the Examples) based on the total weight of polymers present in the multilayer film. In some embodiments, the multilayer film comprises up to 80 wt % of the polyethylene compositions disclosed herein based on the total weight of the multilayer film. All individual values and subranges are included and disclosed herein. For example, the film may comprise from 10 to 80 percent, 20 to 60 percent, 30 to 70 percent, 20 to 50 percent, 30 to 50 percent, based on the total weight of polymers present in the film, of the polyethylene composition.

Other Layers

Multilayer films of the present invention can comprise a variety of other layers in addition to the first outer layer. The number of layers in the multilayer film can depend on a number of factors including, for example, the desired properties of the film, the end use application, the desired thickness of the film, and others. Examples of such layers are discussed further herein. Multilayer films of the present invention comprise up to 13 layers in some embodiments. In various embodiments, the multilayer film comprises 3, 4, 5, 6, 7, 8, 9, 10, 11, 12, or 13 layers.

In some embodiments, a multilayer film of the present invention comprises a second outer layer which is a sealant layer. The sealant layer can be used to form an article or package by using the sealant layer to adhere the film to another film, to a laminate, or to itself. In some embodiments, the sealant layer can comprise any resins known to those having ordinary skill in the art to be useful as a sealant layer. Examples of polymers that can be used to form a sealant layer in some embodiments of the present invention include, without limitation, LDPE (e.g., DOW™ LDPE and AGILITY™ LDPE commercially available from The Dow Chemical Company), LLDPE (e.g., DOWLEX™ LLDPE resins commercially available from The Dow Chemical Company), polyolefin plastomers or elastomers (e.g., AFFINITY™ plastomers and elastomers commercially available from The Dow Chemical Company), ethylene vinyl acetate copolymers (e.g., ELVAX™ ethylene vinyl acetate copolymers commercially available from The Dow Chemical Company) and ionomers of ethylene acid copolymers (e.g., SURLYN™ ionomers commercially available from The Dow Chemical Company).

In some embodiments, depending on the desired use or requirements of the multilayer film, the film can comprise other layers such as barrier layers. For example, for some uses, it may be desirable for the film to provide a barrier to moisture, light, aroma/odor, and/or oxygen transmission. Such barrier layers can comprise, for example, polyamide, ethylene vinyl alcohol copolymer, and other polymers used in barrier layers as known to those of skill in the art. In such embodiments, an inner layer of the multilayer film comprises ethylene vinyl alcohol copolymer or polyamide. In some such embodiments, the multilayer film comprises 30 weight percent or less ethylene vinyl alcohol copolymer and polyamide based on the total weight of the multilayer film. In some embodiments, the multilayer film comprises 20 weight percent or less ethylene vinyl alcohol copolymer and polyamide based on the total weight of the multilayer film. In some embodiments, the multilayer film comprises 10 weight percent or less ethylene vinyl alcohol copolymer and polyamide based on the total weight of the multilayer film. In some embodiments, the multilayer film comprises less than 5% by weight ethylene vinyl alcohol copolymer and polyamide based on the total weight of the multilayer film.

In embodiments comprising an inner layer having ethylene vinyl alcohol copolymer or polyamide, one or more tie layers may be included in the film to adhere the barrier layer(s) to the polyethylene-based layer(s) as known to those of skill in the art based on the teachings herein. In general, a wide variety of tie layer compositions can be used to form a tie layer as known to those of skill in the art based on the teachings herein.

In some embodiments, barrier properties may not be as important for the multilayer film. In some such embodiments, the multilayer film may comprise less than 0.5 weight percent ethylene vinyl alcohol copolymer and polyamide based on the total weight of the film. In some embodiments, the multilayer film comprises less than 0.1 weight percent ethylene vinyl alcohol copolymer and polyamide based on the total weight of the film. In some embodiments, the multilayer film is free of ethylene vinyl alcohol copolymer and polyamide.

As discussed further herein, the total amount of the polyethylene composition (e.g., the Polyethylene Composition described above and IE1 and IE2 in the Examples), especially in the outer layer of the film, can be important and is believed to contribute certain film properties discussed herein. In some embodiments, the multilayer film comprises at least 15 weight percent of the polyethylene composition based on the total weight of the film. In some embodiments, the multilayer film comprises at least 30 weight percent of the polyethylene composition based on the total weight of the film. In some embodiments, the multilayer film comprises at least 50 weight percent of the polyethylene composition, based on the total weight of the film. In some embodiments, the multilayer film comprises at least 60 weight percent of the polyethylene composition, based on the total weight of the film. In some embodiments, the multilayer film comprises up to 80 weight percent of the polyethylene composition, based on the total weight of the film.

In one or more embodiments herein, the film may comprise one or more additives. Additives may include, but are not limited to, antioxidants (e.g., hindered phenolics, such as, IRGANOX® 1010 or IRGANOX® 1076, supplied by BASF), phosphites (e.g., IRGAFOS® 168, also supplied by BASF), cling additives (e.g., PIB (polyisobutylene)), Standostab PEPQ™ (supplied by Sandoz), pigments, colorants, $TiO_2$, anti-stat additives, flame retardants, slip agents, antiblock additives, biocides, antimicrobial agents, and clarifiers/nucleators (e.g., Hyperform HPN-20E, Hyperform HPN 210 M, Millad 3988, and Millad NX 8000, each commercially available from Milliken Chemical). The additives can be included in the film at levels typically used in the art to achieve their desired purpose. In some examples, the one or more additives are included in amounts ranging from 0-10%, based on the total weight of polymer in the film, 0-5%, based on the total weight of polymer in the film, 0.001-5%, based on the total weight of polymer in the film, 0.001-3%, based on the total weight of polymer in the film, 0.005-2%, based on the total weight of polymer in the film, or 0.005-1%, based on the total weight of polymer in the film.

In some embodiments, the multilayer film is advantageously comprised almost entirely of ethylene-based polymers. For example, in some embodiments, other than additives, the multilayer film is comprised entirely of ethylene-based polymers. Based on the total weight of the multilayer film, the multilayer film may include 90% by weight ethylene-based polymer in some embodiments, or 95% by weight ethylene-based polymer in some embodiments, or 99% by weight ethylene-based polymer in some embodiments, or 99.9% by weight ethylene-based polymer in some embodiments, or 100% by weight ethylene-based polymer in some embodiments.

In some embodiments, a multilayer film of the present invention has a total thickness of at least two mils (51 microns). The multilayer films, in some embodiments, have a total thickness of at least three mils (76 microns). In some embodiments, the multilayer film has a thickness of up to five mils (127 microns).

Multilayer films of the present invention can exhibit one or more desirable properties. For example, in some embodiments, multilayer films can exhibit a low surface and/or total haze while still providing good moisture barrier and acceptable mechanical properties.

In some embodiments, a multilayer film of the present invention exhibits a surface haze of 13.5% or less when measured according to ASTM 1003-07. As described in the Test Methods section below, the surface haze is the difference between the total haze and the internal haze. In some embodiments, a multilayer film of the present invention exhibits a surface haze of 10% or less when measured according to ASTM 1003-07.

In some embodiments, a multilayer film of the present invention exhibits a total haze of 30% or less when measured according to ASTM 1003-07.

In some embodiments, a multilayer film of the present invention exhibits a water vapor transmission rate of 0.7 g-mil/100 $in^2$/day or less when measured according to ASTM F1249-06 at a temperature of 38° C. and a relative humidity of 100%. A multilayer film of the present invention, in some embodiments, exhibits a water vapor transmission rate of 0.5 g-mil/100 $in^2$/day or less when measured according to ASTM F1249-06 at a temperature of 38° C. and a relative humidity of 100%.

In some embodiments, a multilayer film of the present invention exhibits a surface haze of 13.5% or less when measured according to ASTM 1003-07, and wherein the multilayer film exhibits a water vapor transmission rate of 0.7 g-mil/100 $in^2$/day or less when measured according to ASTM F1249-06 at a temperature of 38° C. and a relative humidity of 100%. A multilayer film, in some embodiments, exhibits a surface haze of 13.5% or less when measured according to ASTM 1003-07, wherein the multilayer film exhibits a water vapor transmission rate of 0.5 g-mil/100 $in^2$/day or less when measured according to ASTM F-1249-06 at a temperature of 38° C. and a relative humidity of 100%.

In some embodiments, a multilayer film of the present invention exhibits a total haze of 30% or less when measured according to ASTM 1003-07, and wherein the multilayer film exhibits a water vapor transmission rate of 0.7 g-mil/100 $in^2$/day or less when measured according to ASTM F1249-06 at a temperature of 38° C. and a relative humidity of 100%. A multilayer film, in some embodiments, exhibits a total haze of 30% or less when measured according to ASTM 1003-07, wherein the multilayer film exhibits a water vapor transmission rate of 0.5 g-mil/100 $in^2$/day or less when measured according to ASTM F-1249-06 at a temperature of 38° C. and a relative humidity of 100%.

In some embodiments, a multilayer film of the present invention can exhibit a 2% secant modulus in the machine direction of at least 300 MPa when measured according to ASTM D882. In some embodiments, a multilayer film of the present invention can exhibit a 2% secant modulus in the machine direction of at least 350 MPa when measured according to ASTM D882, or at least 400 MPa in other embodiments.

Various embodiments of multilayer films of the present invention may exhibit one or more of the foregoing properties.

A variety of multilayer films according to embodiments of the present invention can be designed based on the teachings herein. For example, a two-layer film (A/B), according to one embodiment, can comprise a sealant layer for Layer A and a polyethylene composition disclosed herein (e.g., the Polyethylene Composition described above and IE1 and IE2 in the Examples) in Layer B with the relative thicknesses of the layers (A/B) being 20%/80%. As another example, a four-layer film (A/B/C/B), according to one embodiment, can comprise a sealant layer for Layer A, a polyethylene composition disclosed herein (e.g., the Polyethylene Composition described above and IE1 and IE2 in the Examples) in Layer B, and a linear low density polyethylene in Layer C with the relative thicknesses of the layers (A/B/C/B) being 20%/30%/30%/20%. As another example, a seven-layer film (A/B/C/D/C/E/B), according to one embodiment, can comprise a sealant layer for Layer A, a polyethylene composition disclosed herein (e.g., the Polyethylene Composition described above and IE1 and IE2 in the Examples) in Layer B, a tie layer for Layer C, a barrier layer (e.g., ethylene vinyl alcohol copolymer or polyamide) for Layer D, and a linear low density polyethylene in Layer E with the relative thicknesses of the layers (A/B/C/D/C/E/B) being 20%/25%/5%/5%/5%/20%/20%.

Multilayer films can be coextruded as blown films or cast films using techniques known to those of skill in the art based on the teachings herein. In particular, based on the compositions of the different film layers disclosed herein, blown film manufacturing lines and cast film manufacturing lines can be configured to coextrude multilayer films of the present invention in a single extrusion step using techniques known to those of skill in the art based on the teachings herein.

Articles

Embodiments of the present invention also comprise articles, such as packages, formed from or incorporating multilayer films of the present invention. Such packages can be formed from any of the inventive multilayer films described herein.

Examples of such articles can include flexible packages, pouches, stand-up pouches, and pre-made packages or pouches. In some embodiments, multilayer films of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

TEST METHODS

Unless otherwise indicated herein, the following analytical methods are used in describing aspects of the present invention:

Melt Index

Melt indices $I_2$ (or I2) and $I_{10}$ (or I10) were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Gel Permeation Chromatography (GPC)

The chromatographic system consisted of a PolymerChar GPC-IR (Valencia, Spain) high temperature GPC chromatograph equipped with an internal IR5 detector. The autosampler oven compartment was set at 1600 Celsius and the column compartment was set at 1500 Celsius. The columns used were 3 Agilent "Mixed B" 30 cm 10-micron linear mixed-bed columns and a 10-µm pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ1)}$$

where M is the molecular weight, A has a value of approximately 0.375-0.445 for Conventional GPC results (referencing an A value that yields 120,000 g/mol Mw linear homopolymer polyethylene) and B is equal to 1.0.

A fifth order polynomial was used to fit the respective polyethylene-equivalent calibration points. Molecular weight distribution and molecular weight moment calculations were calculated using PolymerChar "GPC One" software. The total plate count of the GPC column set was performed with decane (prepared at 0.04 g in 50 milliliters of TCB and dissolved for 20 minutes with gentle agitation.) The plate count (Equation 2) and symmetry (Equation 3) was measured on a 200 microliter injection according to the following equations:

$$\text{Plate Count} = 5.54 * \left( \frac{RV_{Peak\,Max}}{\text{Peak Width at } \frac{1}{2} \text{ height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \quad \text{(EQ 3)}$$

where RV is the retention volume in milliliters and the peak width is in milliliters, peak max is the maximum position of the peak, one tenth height is 1/10 height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 1600 Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum\limits_i IR_i}{\sum\limits_i (IR_i / M_{polyethylene_i})} \quad \text{(EQ 4)}$$

$$M_w = \frac{\sum_i (IR_i * M_{polyethylene_i})}{\sum_i IR_i} \quad \text{(EQ 5)}$$

$$M_z = \frac{\sum_i (IR_i * M_{polyethylene_i}^2)}{\sum_i (IR_i * M_{polyethylene_i})} \quad \text{(EQ 6)}$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$Flowrate_{effective} = Flowrate_{nominal} \times \frac{FlowMarker_{Calibration}}{FlowMarker_{Observed}} \quad \text{(EQ 7)}$$

Neutron Activation Method for Metals

Two sets of duplicate samples were prepared by transferring approximately 3.5 grams of the pellets into pre-cleaned 2 dram polyethylene vials. Standards were prepared for each metal tested from their NIST traceable standard solutions (Certi. pure from SPEX) into 2-dram polyethylene vials. They were diluted using milli-Q pure water to 6 ml and the vials were heat-sealed. The samples and standards were then analyzed for these elements, using a Mark I TRIGA nuclear reactor. The reactions and experimental conditions used for these elements are summarized in the table below. The samples were transferred to un-irradiated vials before doing the gamma-spectroscopy. The elemental concentrations were calculated using CANBERRA software and standard comparative technique. Table 1 provides measurement parameters for metals determination.

TABLE 1

Reactions and experimental conditions used for elements during the neutron activation method

| Elements | Nuclear reaction | Isotope | Half life | Reactor Power |
|---|---|---|---|---|
| Al | $^{27}Al(n, \gamma)^{28}Al$ | $^{28}Al$ | 2.24 m | 250 kW |
| Cl | $^{37}Cl(n, \gamma)^{38}Cl$ | $^{38}Cl$ | 37.2 m | 250 kW |
| Cr | $^{50}Cr(n, \gamma)^{51}Cr$ | $^{51}Cr$ | 27.7 d | 250 kW |
| Hf | $^{180}Hf(n, \gamma)^{181}Hf$ | $^{181}Hf$ | 42.4 d | 250 kW |
| Mg | $^{26}Mg(n, \gamma)^{27}Mg$ | $^{27}Mg$ | 9.46 m | 250 kW |
| Mo | $^{98}Mo(n, \gamma)^{99}Mo$ | $^{99}Mo$ | 66.0 h | 250 kW |
| Nb | $^{93}Nb(n, \gamma)^{94m}Nb$ | $^{94m}Nb$ | 6.26 m | 250 kW |
| Ta | $^{181}Ta(n, \gamma)^{182}Ta$ | $^{182}Ta$ | 114.4 d | 250 kW |
| Ti | $^{50}Ti(n, \gamma)^{51}Ti$ | $^{51}Ti$ | 5.76 m | 250 kW |
| W | $^{186}W(n, \gamma)^{187}W$ | $^{187}W$ | 23.7 h | 250 kW |
| V | $^{51}V(n, \gamma)^{52}V$ | $^{52}V$ | 3.75 m | 250 kW |
| Zr | $^{96}Zr(n, \gamma)^{97}Zr$ | $^{97}Zr$ | 16.91 h | 250 kW |

| Elements | Irradiation Time | Waiting Time | Counting Time | Gamma Energy, keV |
|---|---|---|---|---|
| Al | 2 m | 4 m | 4.5 min | 1778.5 |
| Cl | 2 m | 4 m | 4.5 min | 1642.5, 2166.5 |
| Cr | 90 m | 5 h | 1.6 h | 320 |
| Hf | 90 m | 5 h | 1.6 h | 133, 482 |
| Mg | 2 m | 4 m | 4.5 min | 843.8, 1014 |
| Mo | 90 m | 5 h | 1.6 h | 181, 739.7, 141 |
| Nb | 2 m | 4 m | 4.5 min | 871 |
| Ta | 90 m | 5 h | 1.6 h | 1121, 1222 |
| Ti | 2 m | 4 m | 4.5 min | 320 |
| W | 90 m | 5 h | 1.6 h | 135, 481 |
| V | 2 m | 4 m | 4.5 min | 1434 |
| Zr | 90 m | 5 h | 1.6 h | 743.4 |

Differential Scanning Calorimetry (DSC)

DSC was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt.

Nuclear Magnetic Resonance ($^1$H NMR)

The samples were prepared by adding approximately 130 mg of sample to "3.25 g of 50/50, by weight, tetrachlorethane-$d_2$/perchloroethylene (TCE-$d_2$)" with 0.001 M Cr(A-cAc)$_3$ in a NORELL 1001-7, 10 mm NMR tube. The samples were purged by bubbling $N_2$ through the solvent, via a pipette inserted into the tube, for approximately five minutes, to prevent oxidation. Each tube was capped, sealed with TEFLON tape, and then soaked at room temperature, overnight, to facilitate sample dissolution. The samples were heated and vortexed at 115° C. to ensure homogeneity.

The $^1$H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 16 scans, AQ 1.64s, D1 14s. The double presaturation experiment was run with a modified pulse sequence, 100 scans, AQ 1.64s, presaturation delay 1s, relaxation delay 13 s.

The signal from residual $^1$H in TCE-$d_2$ (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.25 to 5.60 ppm, trisubstituted at about 5.16 to 5.25 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two to obtain a value representing X thousands of carbons (i.e., if the polymer integral=28000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives moles unsaturated groups per 1000 moles of carbons.

Total (Overall) Haze and Internal Haze

Internal haze and total haze were measured according to ASTM D 1003. Internal haze was obtained via refractive index matching using mineral oil (1-2 teaspoons), which was applied as a coating on each surface of the film. A Hazegard Plus (BYK-Gardner USA; Columbia, MD) was used for testing. For each test, 5 samples were examined, and an average was reported. Sample dimensions were "6 in×6 in."

Surface Haze

Surface haze is the difference between total haze and internal haze. The surface haze is determined by subtracting the average internal haze from the average total haze.

Water Vapor Transmission Rate (WVTR)

Water Vapor Transmission Rate is measured in accordance with ASTM F-1249-06 at a temperature of 38° C. and a relative humidity of 100%.

Secant Modulus (2%)

Secant modulus at 2% strain is measured in the machine direction (MD) and cross direction (CD) with an Instron Universal tester according to ASTM D882-12.

Dart Drop Impact

The Dart Drop Impact test determines the energy that causes a plastic film to fail, under specified conditions of impact by a free falling dart. The test result is the energy, expressed in terms of the weight of the missile falling from a specified height, which would result in the failure of 50% of the specimens tested.

After a film is produced, it is conditioned for at least 40 hours at 23° C. (+/−2° C.) and 50% R.H (+/−5), as per ASTM standards. Standard testing conditions are 23° C. (+/−2° C.) and 50% R.H (+/−5), as per ASTM standards.

The test result was reported as either by Method A, which uses a 1.5" diameter dart head and 26" drop height, or by Method B, which uses a 2" diameter dart head and 60" drop height.

The sample thickness was measured at the sample center, and the sample was then clamped by an annular specimen holder with an inside diameter of 5 inches. The dart was loaded above the center of the sample, and released by either a pneumatic or electromagnetic mechanism.

Testing was carried out according to the 'staircase' method. If the sample failed, a new sample was tested with the weight of the dart reduced by a known and fixed amount. If the sample did not fail, a new sample was tested with the weight of the dart increased by a known amount. After 20 specimens had been tested, the number of failures was determined. If this number was 10, then the test is complete. If the number was less than 10, then the testing continued, until 10 failures had been recorded. If the number was greater than 10, testing was continued, until the total of non-failures was 10. The dart impact value was determined from these data, as per ASTM D1709, and expressed in grams, as either the Dart Drop Impact of Type A or Type B (or dart impact value (Method A) or dart impact value (Method B)). In some cases, the sample dart impact value may lie between A and B. In these cases, it is not possible to obtain a quantitative dart value.

The terms "dart drop impact" and "dart impact" are used synonymously herein to refer to this test method.

MD and CD Elmendorf Tear Strength

Elmendorf tear strength in the machine and cross directions are measured in accordance with ASTM D1922. The force in grams required to propagate tearing across a film or sheeting specimen is measured using a precisely calibrated pendulum device. Acting by gravity, the pendulum swings through an arc, tearing the specimen from a precut slit. The specimen is held on one side by the pendulum and on the other side by a stationary member. The loss in energy by the pendulum is indicated by a pointer or by an electronic scale. The scale indication is a function of the force required to tear the specimen. The sample used is the 'constant radius geometry' as specified in D1922. Testing would be typically carried out on samples that have been cut from both the MD and CD directions. Prior to testing, the sample thickness is measured at the sample center. A total of 15 specimens per direction are tested, and the average tear strength is reported. Samples that tear at an angle greater than 60° from the vertical are described as 'oblique' tears—such tears should be noted, though the strength values are included in the average strength calculation.

Some embodiments of the invention will now be described in detail in the following Examples.

EXAMPLES

The following examples illustrate the present invention, but are not intended to limit the scope of the invention.

A multi-metal catalyst is prepared (Catalyst 1). Catalyst 1 is then used to prepare a polyethylene composition in a solution polymerization for use in an inventive multilayer film according to some embodiments of the present invention. Subsequently, the polyethylene compositions are used to prepare inventive multilayer films. Testing is carried out on both the polyethylene compositions and the film.

General Description of Preparation of Catalysts

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. In one embodiment, the concentrations of components are such that when the active halide, such as a metallic or non-metallic halide, and the magnesium complex are combined, the resultant slurry is from about 0.005 to about 0.3 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., or alternatively, 0° C. to 50° C.; a time ranging from 1 to 12 hours, or alternatively, from 4 to 6 hours; or both. The result is a magnesium halide-based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. Without wishing to be bound by any theory of mechanism, it is suggested that this aging serves to facilitate or enhance adsorption of additional metals onto the support.

Once the conditioned support is prepared and suitably aged, it is brought into contact with a titanium compound. In certain preferred embodiments, titanium halides or alkoxides, or combinations thereof, may be selected. Conditions may include a temperature within the range from 0° C. to 50° C., or alternatively, from 25° C. to 35° C.; a time from 3 hours to 24 hours, or alternatively, from 6 hours to 12 hours; or both. The result of this step is adsorption of at least a portion of the titanium compound onto the conditioned magnesium halide support.

Additional Steps in Preparing Multi-Metal Catalyst Used to Make the Polyethylene Composition for Use in the Outer Layer of Inventive Multilayer Films For those catalysts used to make the polyethylene composition to be used in the inventive multilayer films, i.e. multi-metal catalysts herein, two additional metals, referred to herein as "the second metal" and "the third metal" for convenience, will also be adsorbed onto the magnesium based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

In certain embodiments, the multi-metal procatalyst exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., or alternatively, from 15° C. to 200° C. In the preparation of the catalytic reaction product, it is not necessary to separate hydrocarbon soluble components from hydrocarbon insoluble components. Time for contact between the procatalyst and cocatalyst may range, for example, from 0 to 240 seconds, or alternatively, from 5 to 120 seconds. Various combinations of these conditions may be employed.

Catalyst 1 Preparation

To approximately 109 kg of 0.20 M $MgCl_2$ slurry was added 7.76 kg of $(C_2H_5)AlCl_2$ (EADC) solution (15 wt % in heptanes), followed by agitation for 8 hours. A mixture of $TiCl_4/VOCl_3$ (85 mL and 146 mL, respectively) was then added, followed by a solution of $Zr(TMHD)_4$ (Zirconium tetrakis(2,2,6,6-tetramethyl-3,5-heptanedionate) (0.320 kg of a 0.30 M solution in Isopar E). These two additions were performed sequentially within 1 hour of each other. The resulting catalyst premix was aged with agitation for an additional 8 hours prior to use.

Each of the catalysts prepared hereinabove is then used to prepare Polyethylene Compositions as described below.

Production of Polyethylene Compositions for Use in Inventive Multilayer Films

The polyethylene resins are produced via a solution polymerization according to the following exemplary process. All raw materials (monomer) and the process solvent (a narrow boiling range high-purity isoparaffinic solvent, Isopar-E) are purified with molecular sieves before introduction into the reaction environment. Hydrogen is supplied in pressurized cylinders as a high purity grade and is not further purified. The reactor monomer feed stream is pressurized via a mechanical compressor to above reaction pressure. The solvent feed is pressurized via a pump to above reaction pressure. The individual catalyst components are manually batch diluted to specified component concentrations with purified solvent and pressured to above reaction pressure. All reaction feed flows are measured with mass flow meters and independently controlled with computer automated valve control systems.

The continuous solution polymerization reactor consists of a liquid full, non-adiabatic, isothermal, circulating, loop reactor which mimics a continuously stirred tank reactor (CSTR) with heat removal. Independent control of all fresh solvent, monomer, hydrogen, and catalyst component feeds is possible. The total fresh feed stream to the reactor (solvent, monomer, and hydrogen) is temperature controlled by passing the feed stream through a heat exchanger. The catalyst components are injected into the polymerization reactor through a specially designed injection stinger and are combined into one mixed catalyst/cocatalyst feed stream prior to injection into the reactor. The primary catalyst component feed is computer controlled to maintain the reactor monomer concentration at a specified target. The cocatalyst component is fed based on calculated specified molar ratios to the primary catalyst component. Immediately following each fresh injection location (either feed or catalyst), the feed streams are mixed with the circulating polymerization reactor contents with static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a positive displacement pump.

The final reactor effluent enters a zone where it is deactivated with the addition of and reaction with water. At this same reactor exit location other additives may also be added (such as an acid scavenging agent and anti-oxidants). The stream then goes through a static mixer to disperse the post reactor additive components.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted monomer is recycled back to the reactor after passing through a purification system. A small amount of solvent and monomer is purged from the process.

Table 2 summarizes the polymerization conditions for Polyethylene Composition 1 (IE1) to be used in the inventive multilayer films. Additives used in the polymerization of IE1 were 1000 ppm IRGAFOS™ 168 (which is tris (2,4 di-tert-butylphenyl) phosphite), 250 ppm IRGANOX™ 1076 (which is octadecyl-3-(3,5-di-tert-butyl-4-hydroxyphenyl)propionate)), and 200 ppm IRGANOX™ 1010 (tetrakis(methylene(3,5-di-tert-butyl-4-hydroxyhydrocinnamate))methane). IRGAFOS™ 168 and IRGANOX™ 1076 are commercially available from BASF. IRGANOX™ 1010 is available from BASF.

TABLE 2

Polymerization Conditions

| Sample | | IE1 |
|---|---|---|
| Reactor Configuration | Type | Single |
| Comonomer type | Type | none |
| Reactor Feed Solvent/Ethylene Mass Flow Ratio | g/g | 4.0 |
| Reactor Feed Comonomer/Ethylene Mass Flow Ratio | g/g | 0 |
| Reactor Feed Hydrogen/Ethylene Mass Flow Ratio | g/g | 9.8E−05 |
| Reactor Temperature | ° C. | 190 |
| Reactor Pressure | barg | 50 |
| Reactor Ethylene Conversion | % | 93.0 |
| Reactor Catalyst Type | Type | Catalyst 1 |
| Reactor Co-Catalyst Type | Type | TEA* |
| Reactor Co-Catalyst to Catalyst Molar Ratio (Al to Ti ratio) | Ratio | 12.0 |
| Reactor Residence Time | Min | 5.4 |

*TEA is tri-ethyl-aluminum.

For use in comparative examples, certain comparative polyethylene compositions are used. Comparative Polyethylene Composition A (Comp. A) is ELITE™ 5960G, available from The Dow Chemical Company.

A second Polyethylene Composition (IE2) is prepared for use in inventive multilayer films according to some embodiments of the present invention. IE2 is prepared using the same catalyst system and comparable reactor conditions to IE1 except that IE2 has a density of 0.956 g/cm$^3$, a melt index ($I_2$) of 1.5 g/10 minutes, and an $I_{10}/I_2$ of 6.8. In addition, the additive used in the polymerization for IE2 was 1000 ppm IRGAFOS™ 168 (which is tris (2,4 di-tert-butylphenyl) phosphite).

Certain properties of Polyethylene Composition 1 (IE1), Polyethylene Composition 2 (IE2), and Comparative Composition A (Comp. A) are measured and presented in Tables 3-7.

TABLE 3

Resin Melt Index and Density Data

| Sample | $I_2$, g/10 min | $I_{10}/I_2$ | Density (g/cc) |
|---|---|---|---|
| IE1 | 0.96 | 6.67 | 0.958 |
| IE2 | 1.5 | 6.80 | 0.956 |
| Comp. A | 0.85 | 11.0 | 0.962 |

TABLE 4

Conventional GPC Data

| Type | Mn (g/mol) | Mw (g/mol) | Mz (g/mol) | Mw/Mn | Mz/Mw | Mz/Mn |
|---|---|---|---|---|---|---|
| IE1 | 41,449 | 120,838 | 325,384 | 2.92 | 2.69 | 7.85 |
| IE2 | 37,646 | 112,357 | 305,187 | 2.98 | 2.72 | 8.11 |
| Comp. A | 20,012 | 105,866 | 290,854 | 5.29 | 2.75 | 14.53 |

TABLE 5

DSC Data

| Type | $T_m$ (° C.) | Heat of Fusion (J/g) | % Crystallinity | $T_c$ (° C.) |
|---|---|---|---|---|
| IE1 | 134.8 | 216.9 | 74.3 | 120.1 |
| IE2 | 133.3 | 221.7 | 75.9 | 118.8 |
| Comp. A | 133.3 | 218.2 | 74.7 | 119.1 |

Tm: Melting point,
Tc: Crystallization point

TABLE 6

Neutron Activation Data*

| Type | Al, ppm | Mg, ppm | Ti, ppm | V, ppm | Hf, ppb | Zr, ppm | Cl, ppm |
|---|---|---|---|---|---|---|---|
| IE1 | 6.5 | 14 | 0.60 | 1.45 | ND | 0.840 | 49 |

*Niobium (Nb) (5 ppm), tantalum (Ta) (50 ppb), chromium (Cr) (0.5 ppm), molybdenum (Mo) (50 ppb), and tungsten (W) (5 ppm) were not detected in any of the examples at their respective detection limits, as indicated in the parentheses following each element.
ND = not detected.

TABLE 7

| 1H NMR Data. Unsaturation Unit/1,000,000 C | | | | |
|---|---|---|---|---|
| Type | Vinylene | Trisubstitued | Vinyl | Vinylidene | Total Unsaturation |
| IE1 | 5 | ND | 208 | 2 | 216 |

Inventive Film 1 and Comparative Film A

An inventive and a comparative multilayer film are prepared using an Alpine seven-layer coextrusion blown film line. Each multilayer film is a seven layer film having a structure of A/B/C/D/E/F/G. The blown film line was equipped with an annular die having a diameter of 9.84 inches and a die gap of 78.7 mils. The blow up ratio (BUR) is 2.5:1. The output rate is 310 lbs/hr with a specific rate of 10 pounds/hour/inch die. The film had a nominal width of 30 inches and a nominal thickness of 3.5 mils. The melt temperature is between 450 and 490° F.

The structures of Inventive Film 1 and Comparative Film A are shown in Table 8 with the amount of the components in each layer provided as a weight percentage of the total weight of the layer.

TABLE 8

| Layer (Thickness; %) | Inventive Film 1 | Comparative Film A |
|---|---|---|
| A (0.35 mils; 10%) | 87.0 wt % IE2<br>10.0 wt % AGILITY™ 1021<br>2.0 wt % slip agent<br>1.0 wt % antiblock | 87.0 wt % Comp. A<br>10.0 wt % AGILITY™ 1021<br>2.0 wt % slip agent<br>1.0 wt % antiblock |
| B (0.35 mils; 10%) | 87.0 wt % IE2<br>10.0 wt % AGILITY™ 1021<br>2.0 wt % slip agent<br>1.0 wt % antiblock | 87.0 wt % Comp. A<br>10.0 wt % AGILITY™ 1021<br>2.0 wt % slip agent<br>1.0 wt % antiblock |
| C (0.35 mils; 10%) | 90.0 wt % IE2<br>10.0 wt % AGILITY™ 1021 | 90.0 wt % Comp. A<br>10.0 wt % AGILITY™ 1021 |
| D (0.53 mils; 15%) | 100.0 wt % DOWLEX™ GM 8070G | 100.0 wt % INNATE™ ST-50 |
| E (0.53 mils; 15%) | 90.0 wt % IE2<br>10.0 wt % AGILITY™ 1021 | 90.0 wt % Comp. A<br>10.0 wt % AGILITY™ 1021 |
| F (0.53 mils; 15%) | 90.0 wt % IE2<br>10.0 wt % AGILITY™ 1021 | 90.0 wt % Comp. A<br>10.0 wt % AGILITY™ 1021 |
| G (0.88 mils; 25%) | 95.0 wt % AFFINITY™ PF 1146G<br>5.0 wt % antiblock | 95.0 wt % AFFINITY™ PF 1146G<br>5.0 wt % antiblock |

IE2 is produced as described above. AGILITY™ 1021 is a low density polyethylene having a density of 0.919 g/cm$^3$ and a melt index (I2) of 1.85 g/10 minutes commercially available from The Dow Chemical Company. DOWLEX™ GM 8070G is a linear low density polyethylene having a density of 0.917 g/cm$^3$ and a melt index (I$_2$) of 0.90 g/10 minutes commercially available from The Dow Chemical Company. AFFINITY™ PF 1146G is a polyolefin plastomer having a density of 0.899 g/cm$^3$ and a melt index (I$_2$) of 1.0 g/10 minutes. The slip agent, and antiblock are commercially available and not particularly critical to this embodiment.

Various properties of the films are measured and shown in Table 9. The methods used for measuring these properties are described in the Test Methods section above.

TABLE 9

| | Units | Inventive Film 1 | Comparative Film A |
|---|---|---|---|
| Thickness | mil | 3.5 | 3.5 |
| 20° Gloss | | 40.0 | 36.6 |
| 45° Gloss | | 51.4 | 47.0 |
| Internal Haze | % | 17.6 | 25.1 |
| Total Haze | % | 28.8 | 45.1 |
| Surface Haze | % | 11.2 | 20.0 |
| Water Vapor Transmission Rate (50% Relative Humidity) | g*mil/ 100 in$^2$/day | 0.544 | 0.513 |
| Water Vapor Transmission Rate (100% Relative Humidity) | g*mil/ 100 in$^2$/day | 0.548 | 0.504 |
| 2% Secant Modulus (Machine Direction) | psi | 66,100 | 72,400 |
| 2% Secant Modulus (Cross Direction) | psi | 78,600 | 77,300 |

As can be seen in the above data, use of the Polyethylene Composition (IE2) in Inventive Film 1 provides much improved haze values relative to Comparative Film A, while also providing comparable water vapor transmission rates and secant modulus despite IE2 having a lower density than Comp. A (0.956 g/cm$^3$ vs. 0.962 g/cm$^3$).

Inventive Films 2-3 and Comparative Films B-E

Additional inventive and comparative multilayer films are prepared using an Alpine 7-layer coextrusion blown film line. Each multilayer film is a seven layer film having a structure of A/B/C/D/E/F/G. The blown film line was equipped with an annular die having a diameter of 9.84 inches and a die gap of 78.7 mils. The blow up ratio (BUR) is 2.5:1. The output rate is 325 lbs/hr with a specific rate of 10.5 pounds/hour/inch die. The film had a nominal width of 38 inches and a nominal thickness of 3.5 mils. The melt temperature is between 440 and 460° F.

The structures of Inventive Films 2-3 and Comparative Films B-E are shown in Tables 10A-10C with the amount of the components in each layer provided as a weight percentage of the total weight of the layer.

TABLE 10A

| Layer (Thickness; %) | Inventive Film 2 | Inventive Film 3 |
|---|---|---|
| A (0.42 mils; 12%) | 86.0 wt % IE2<br>10.0 wt % AGILITY™ 1021<br>2.0 wt % slip agent<br>2.0 wt % antiblock | 86.0 wt % IE2<br>10.0 wt % AGILITY™ 1021<br>2.0 wt % slip agent<br>2.0 wt % antiblock |
| B (0.42 mils; 12%) | 86.0 wt % IE2<br>10.0 wt % AGILITY™ 1021<br>2.0 wt % slip agent<br>2.0 wt % antiblock | 86.0 wt % IE2<br>10.0 wt % AGILITY™ 1021<br>2.0 wt % slip agent<br>2.0 wt % antiblock |
| C (0.525 mils; 15%) | 90.0 wt % IE2<br>10.0 wt % AGILITY™ 1021 | 90.0 wt % IE2<br>10.0 wt % AGILITY™ 1021 |
| D (0.525 mils; 15%) | 100.0 wt % INNATE™ ST50 | 100.0 wt % DOWLEX™ GM 8070G |
| E (0.525 mils; 15%) | 90.0 wt % IE2<br>10.0 wt % AGILITY™ 1021 | 90.0 wt % IE2<br>10.0 wt % AGILITY™ 1021 |
| F (0.525 mils; 15%) | 90.0 wt % IE2<br>10.0 wt % AGILITY™ 1021 | 90.0 wt % IE2<br>10.0 wt % AGILITY™ 1021 |
| G | 97.0 wt % AFFINITY™ | 97.0 wt % AFFINITY™ |

TABLE 10A-continued

| Layer (Thickness; %) | Inventive Film 2 | Inventive Film 3 |
|---|---|---|
| (0.56 mils; 16%) | PL 1850G 3.0 wt % antiblock | PL 1850G 3.0 wt % antiblock |

TABLE 10B

| Layer (Thickness; %) | Compar. Film B | Compar. Film C |
|---|---|---|
| A (0.42 mils; 12%) | 86.0 wt % ELITE ™ 5960G1 10.0 wt % AGILITY ™ 1021 2.0 wt % slip agent 2.0 wt % antiblock | 86.0 wt % ELITE ™ 5960G1 10.0 wt % AGILITY ™ 1021 2.0 wt % slip agent 2.0 wt % antiblock |
| B (0.42 mils; 12%) | 86.0 wt % ELITE ™ 5960G1 10.0 wt % AGILITY ™ 1021 2.0 wt % slip agent 2.0 wt % antiblock | 86.0 wt % ELITE ™ 5960G1 10.0 wt % AGILITY ™ 1021 2.0 wt % slip agent 2.0 wt % antiblock |
| C (0.525 mils; 15%) | 90.0 wt % ELITE ™ 5960G1 10.0 wt % AGILITY ™ 1021 | 90.0 wt % ELITE ™ 5960G1 10.0 wt % AGILITY ™ 1021 |
| D (0.525 mils; 15%) | 100.0 wt % INNATE ™ ST50 | 100.0 wt % DOWLEX ™ GM 8070G |
| E (0.525 mils; 15%) | 90.0 wt % ELITE ™ 5960G1 10.0 wt % AGILITY ™ 1021 | 90.0 wt % ELITE ™ 5960G1 10.0 wt % AGILITY ™ 1021 |
| F (0.525 mils; 15%) | 90.0 wt % ELITE ™ 5960G1 10.0 wt % AGILITY ™ 1021 | 90.0 wt % ELITE ™ 5960G1 10.0 wt % AGILITY ™ 1021 |
| G (0.56 mils; 16%) | 97.0 wt % AFFINITY ™ PL 1850G 3.0 wt % antiblock | 97.0 wt % AFFINITY ™ PL 1850G 3.0 wt % antiblock |

TABLE 10C

| Layer (Thickness; %) | Compar. Film D | Compar. Film E |
|---|---|---|
| A (0.42 mils; 12%) | 86.0 wt % DMDA-6400 10.0 wt % AGILITY ™ 1021 2.0 wt % slip agent 2.0 wt % antiblock | 86.0 wt % HDPE 10.0 wt % AGILITY ™ 1021 2.0 wt % slip agent 2.0 wt % antiblock |
| B (0.42 mils; 12%) | 86.0 wt % DMDA-6400 10.0 wt % AGILITY ™ 1021 2.0 wt % slip agent 2.0 wt % antiblock | 86.0 wt % HDPE 10.0 wt % AGILITY ™ 1021 2.0 wt % slip agent 2.0 wt % antiblock |
| C (0.525 mils; 15%) | 90.0 wt % DMDA-6400 10.0 wt % AGILITY ™ 1021 | 90.0 wt % HDPE 10.0 wt % AGILITY ™ 1021 |
| D (0.525 mils; 15%) | 100.0 wt % INNATE ™ ST50 | 100.0 wt % INNATE ™ ST50 |
| E (0.525 mils; 15%) | 90.0 wt % DMDA-6400 10.0 wt % AGILITY ™ 1021 | 90.0 wt % HDPE 10.0 wt % AGILITY ™ 1021 |
| F (0.525 mils; 15%) | 90.0 wt % DMDA-6400 10.0 wt % AGILITY ™ 1021 | 90.0 wt % HDPE 10.0 wt % AGILITY ™ 1021 |
| G (0.56 mils; 16%) | 97.0 wt % AFFINITY ™ PL 1850G 3.0 wt % antiblock | 97.0 wt % AFFINITY ™ PL 1850G 3.0 wt % antiblock |

IE2 is produced as described above. AGILITY™ 1021 is a low density polyethylene having a density of 0.919 g/cm$^3$ and a melt index ($I_2$) of 1.85 g/10 minutes commercially available from The Dow Chemical Company. INNATE™ ST50 is a polyethylene having a density of 0.918 g/cm$^3$ and a melt index ($I_2$) of 0.85 g/10 minutes commercially available from The Dow Chemical Company. DOWLEX™ GM 8070G is a linear low density polyethylene having a density of 0.917 g/cm$^3$ and a melt index ($I_2$) of 0.90 g/10 minutes commercially available from The Dow Chemical Company. AFFINITY™ PL 1850G is a polyolefin plastomer having a density of 0.902 g/cm$^3$ and a melt index ($I_2$) of 3 g/10 minutes commercially available from The Dow Chemical Company. INNATE™ ST50 is a polyethylene having a density of 0.918 g/cm$^3$ and a melt index ($I_2$) of 0.85 g/10 minutes commercially available from The Dow Chemical Company. ELITE™ 5960G1 is an enhanced polyethylene having a density of 0.962 g/cm$^3$ and a melt index ($I_2$) of 0.85 g/10 minutes commercially available from The Dow Chemical Company. DMDA-6400 NT7 is a high density polyethylene having a density of 0.961 g/cm$^3$ and a melt index (12) of 0.8 g/10 minutes commercially available from The Dow Chemical Company. HDPE is a high density polyethylene having a density of 0.962 g/cm$^3$ and a melt index ($I_2$) of 0.85 g/10 minutes, commercially available from The Dow Chemical Company that also includes a nucleating agent.

Various properties of the films are measured and shown in Table 11. The methods used for measuring these properties are described in the Test Methods section above.

TABLE 11

|  | Units | Inv. Film 2 | Inv. Film 3 | Comp. Film B | Comp. Film C | Comp. Film D | Comp. Film E |
|---|---|---|---|---|---|---|---|
| Thickness | mil | 3.5 | 3.5 | 3.5 | 3.5 | 3.5 | 3.5 |
| 20° Gloss |  | 64 | 62 | 57 | 60 | 45 | 58 |
| 45° Gloss |  | 54 | 53 | 52 | 51 | 49 | 51 |
| Internal Haze | % | 16.0 | 16.5 | 24.9 | 23.8 | 19.6 | 21.3 |
| Total Haze | % | 28.5 | 28.0 | 41.8 | 43.0 | 39.4 | 35.6 |
| Surface Haze | % | 12.5 | 11.5 | 16.9 | 19.2 | 19.8 | 14.3 |
| Water Vapor Transmission Rate (100% Relative Humidity) | g * mil/ 100 in$^2$/ day | 0.489 | 0.490 | 0.524 | 0.531 | 0.455 | 0.35 |

TABLE 11-continued

|  | Units | Inv. Film 2 | Inv. Film 3 | Comp. Film B | Comp. Film C | Comp. Film D | Comp. Film E |
|---|---|---|---|---|---|---|---|
| 2% Secant Modulus (Machine Direction) | psi | 74,100 | 75,100 | 78,800 | 77,100 | 81,100 | 80,100 |
| 2% Secant Modulus (Cross Direction) | psi | 88,100 | 88,600 | 86,100 | 83,600 | 93,500 | 97,000 |
| Dart Drop Impact (Method A) | g | 173 | 134 | 179 | 162 | 79 | 128 |
| Elmendorf Tear (Cross Direction) | g | 1040 | 1401 | 1314 | 1341 | 1410 | 135 |
| Elmendor Tear (Machine Direction) | g | 148 | 174 | 342 | 212 | 147 | 148 |

The data in Table 11 show that Inventive Films 2 and 3 provide lower surface haze, higher gloss, comparable water vapor transmission rate, and a better dart to tear balance relative to the Comparative Films.

Inventive Films 4-5 and Comparative Films F-G

Additional inventive and comparative multilayer films are prepared using an Alpine 7-layer coextrusion blown film line. Each multilayer film is a seven layer film having a structure of A/B/C/D/E/F/G. The blown film line was equipped with an annular die having a diameter of 9.84 inches and a die gap of 78.7 mils. The blow up ratio (BUR) is 2.5:1. The output rate is 324-375 lbs/hr with a specific rate of 10.5-12.1 pounds/hour/inch die. The film had a nominal width of 38.5 inches and a nominal thickness of 3.5 mils. The melt temperature is between 435 and 460° F.

These examples all include ethylene vinyl alcohol copolymer in some layers for applications where increased oxygen barrier performance is desired. The prior examples are focused on films that are essentially entirely polyethylene, excluding the slip agent and antiblock additives. The structures of Inventive Films 4-5 and Comparative Films F-G are shown in Tables 12A and 12B with the amount of the components in each layer provided as a weight percentage of the total weight of the layer.

TABLE 12A

| Layer (Thickness; %) | Inventive Film 4 | Inventive Film 5 |
|---|---|---|
| A (0.35 mils; 10%) | 86.0 wt % IE2<br>10.0 wt % AGILITY™ 1021<br>2.0 wt % RETAIN™ 3000<br>1.0 wt % antiblock<br>1.0 wt % slip agent | 73.0 wt % IE2<br>10.0 wt % AGILITY™ 1021<br>13.0 wt % RETAIN™ 3000<br>2.0 wt % antiblock<br>2.0 wt % slip agent |
| B (0.875 mils; 25%) | 84.0 wt % IE2<br>16.0 wt % RETAIN™ 3000 | 87.0 wt % IE2<br>13.0 wt % RETAIN™ 3000 |
| C (0.28 mils; 8%) | 85.0 wt % INNATE™ ST50<br>15.0 wt % AMPLIFY™ TY 1057TH | 85.0 wt % DOWLEX™ GM 8070G<br>15.0 wt % AMPLIFY™ TY 1057TH |
| D (0.28 mils; 8%) | 100.0 wt % Soarnol ET3803RB | 100.0 wt % Soarnol ET3803RB |
| E (0.28 mils; 8%) | 85.0 wt % INNATE™ ST50<br>15.0 wt % AMPLIFY™ TY 1057TH | 85.0 wt % DOWLEX™ GM 8070G<br>15.0 wt % AMPLIFY™ TY 1057TH |
| F (0.875 mils; 25%) | 84.0 wt % IE2<br>16.0 wt % RETAIN™ 3000 | 87.0 wt % IE2<br>13.0 wt % RETAIN™ 3000 |
| G (0.56 mils; 16%) | 97.0 wt % AFFINITY™ PL 1850G<br>3.0 wt % antiblock | 97.0 wt % AFFINITY™ PL 1850G<br>3.0 wt % antiblock |

TABLE 12B

| Layer (Thickness; %) | Comparative Film F | Comparative Film G |
|---|---|---|
| A (0.35 mils; 10%) | 86.0 wt % ELITE™ 5960G1<br>10.0 wt % AGILITY™ 1021<br>2.0 wt % antiblock<br>2.0 wt % slip agent | 86.0 wt % DMDA-6400<br>10.0 wt % AGILITY™ 1021<br>2.0 wt % antiblock<br>2.0 wt % slip agent |
| B (0.875 mils; 25%) | 84.0 wt % ELITE™ 5960G1<br>16.0 wt % RETAIN™ 3000 | 84.0 wt % DMDA-6400<br>16.0 wt % RETAIN™ 3000 |
| C (0.28 mils; 8%) | 85.0 wt % INNATE™ ST50<br>15.0 wt % AMPLIFY™ TY 1057TH | 85.0 wt % INNATE™ ST50<br>15.0 wt % AMPLIFY™ TY 1057TH |
| D (0.28 mils; 8%) | 100.0 wt % Soarnol ET3803RB | 100.0 wt % Soarnol ET3803RB |
| E (0.28 mils; 8%) | 85.0 wt % INNATE™ ST50<br>15.0 wt % AMPLIFY™ TY 1057TH | 85.0 wt % INNATE™ ST50<br>15.0 wt % AMPLIFY™ TY 1057TH |
| F (0.875 mils; 25%) | 84.0 wt % ELITE™ 5960G1<br>16.0 wt % RETAIN™ 3000 | 84.0 wt % DMDA-6400<br>16.0 wt % RETAIN™ 3000 |
| G (0.56 mils; 16%) | 97.0 wt % AFFINITY™ PL 1850G<br>3.0 wt % antiblock | 97.0 wt % AFFINITY™ PL 1850G<br>3.0 wt % antiblock |

IE2 is produced as described above. AGILITY™ 1021 is a low density polyethylene having a density of 0.919 g/cm³ and a melt index ($I_2$) of 1.85 g/10 minutes commercially available from The Dow Chemical Company. INNATE™

ST50 is a polyethylene having a density of 0.918 g/cm³ and a melt index ($I_2$) of 0.85 g/10 minutes commercially available from The Dow Chemical Company. DOWLEX™ GM 8070G is a linear low density polyethylene having a density of 0.917 g/cm³ and a melt index ($I_2$) of 0.90 g/10 minutes commercially available from The Dow Chemical Company. AFFINITY™ PL 1850G is a polyolefin plastomer having a density of 0.902 g/cm³ and a melt index ($I_2$) of 3 g/10 minutes commercially available from The Dow Chemical Company. INNATE™ ST50 is a polyethylene having a density of 0.918 g/cm³ and a melt index ($I_2$) of 0.85 g/10 minutes commercially available from The Dow Chemical Company. ELITE™ 5960G1 is an enhanced polyethylene having a density of 0.962 g/cm³ and a melt index ($I_2$) of 0.85 g/10 minutes commercially available from The Dow Chemical Company. DMDA-6400 NT7 is a high density polyethylene having a density of 0.961 g/cm³ and a melt index ($I_2$) of 0.8 g/10 minutes commercially available from The Dow Chemical Company. AMPLIFY™ TY 1057H is a maleic anhydride grafted polymer having a density of 0.912 g/cm³ and a melt index ($I_2$) of 3 g/10 minutes commercially available from The Dow Chemical Company. RETAIN™ 3000 is a functional polymer that promotes compatibilization between polyolefins and polar polymers (e.g., ethylene vinyl alcohol copolymer and polyamide) which has a density of 0.870 g/cm³ and a melt index ($I_2$) of 660 g/10 minutes commercially available from The Dow Chemical Company. Soarnol ET3803RB is an ethylene vinyl alcohol copolymer having an ethylene content of 38 mol %, a melt flow rate (210° C., 2.16 kg) of 4.0 g/10 minutes, and a density of 1.17 g/cm³ commercially available from Mitsubishi Chemical Corporation. The slip agent and antiblock are commercially available and not particularly critical to this embodiment.

Various properties of the films are measured and shown in Table 13. The methods used for measuring these properties are described in the Test Methods section above.

TABLE 13

|  | Units | Inv. Film 4 | Inv. Film 5 | Comp. Film F | Comp. Film G |
| --- | --- | --- | --- | --- | --- |
| Thickness | mil | 3.5 | 3.5 | 3.5 | 3.5 |
| 20° Gloss |  | 60 | 47 | 48 | 42 |
| 45° Gloss |  | 57 | 54 | 52 | 51 |
| Internal Haze | % | 25.7 | 28.4 | 25.7 | 21.4 |
| Total Haze | % | 36.3 | 38.1 | 41.0 | 37.9 |
| Surface Haze | % | 10.6 | 9.7 | 15.3 | 16.5 |
| Water Vapor Transmission Rate (100% Relative Humidity) | g*mil/ 100 in²/day | 0.678 | 0.648 | 0.594 | 0.489 |
| 2% Secant Modulus (Machine Direction) | psi | 81,500 | 83,300 | 82,700 | 86,100 |
| 2% Secant Modulus (Cross Direction) | psi | 90,400 | 89,800 | 85,500 | 88,900 |
| Dart Drop Impact (Method A) | g | 107 | 117 | 48 | 101 |
| Elmendorf Tear (Cross Direction) | g | 365 | 913 | 266 | 443 |
| Elmendorf Tear (Machine Direction) | g | 1306 | 1532 | 183 | 412 |

The data in Table 13 show that Inventive Films 4 and 5 provide lower surface haze, higher gloss, and a better dart to tear balance relative to the Comparative Films.

That which is claimed:

1. A multilayer film comprising:
   at least one outer layer comprising at least 50 wt % of a polyethylene composition comprising the reaction product of ethylene and optionally, one or more alpha-olefin comonomers, wherein the polyethylene composition is characterized by the following properties:
   a. a melt index, $I_2$, of from 0.3 to 3.0 g/10 min;
   b. a density of from 0.950 to 0.965 g/cm$^3$;
   c. a melt flow ratio, $I_{10}/I_2$, of from 6.3 to 7.5; and
   d. a molecular weight distribution (MWD) of from 2.2 to 3.5,
   wherein the multilayer film has a thickness of at least 2 mils, wherein the multilayer film comprises at least 50% by weight polyethylene, wherein the multilayer film exhibits a surface haze of 13.5% or less when measured according to ASTM 1003-07, and wherein the multilayer film exhibit a water vapor transmission rate of 0.7 g-mil/100 in$^2$/day or less when measured according to ASTM F1249-06 at a temperature of 38° C. and a relative humidity of 100%.

2. The multilayer film of claim 1 further comprising an inner layer, wherein the inner layer comprises ethylene vinyl alcohol copolymer or polyamide.

3. The multilayer film of claim 2, wherein the multilayer film comprises 30 weight percent or less ethylene vinyl alcohol copolymer and polyamide based on the total weight of the multilayer film.

4. The multilayer film of claim 1, wherein the multilayer film comprises ethylene vinyl alcohol and polyamide, and the combined weight of the ethylene vinyl alcohol and polyamide is less than 5% by weight, based on the total weight of the multilayer film.

5. A multilayer film comprising:
   at least one outer layer comprising at least 50 wt % of a polyethylene composition comprising the reaction product of ethylene and optionally, one or more alpha-olefin comonomers, wherein the polyethylene composition is characterized by the following properties:
   a. a melt index, $I_2$, of from 0.3 to 3.0 g/10 min;
   b. a density of from 0.950 to 0.965 g/cm$^3$;
   c. a melt flow ratio, $I_{10}/I_2$, of from 6.3 to 7.5; and
   d. a molecular weight distribution (MWD) of from 2.2 to 3.5,
   wherein the multilayer film has a thickness of at least 2 mils, wherein the multilayer film comprises at least 90% by weight polyethylene, wherein the multilayer film exhibits a surface haze of 13.5% or less when measured according to ASTM 1003-07, wherein the multilayer film exhibits a water vapor transmission rate of 0.5 g-mil/100 in$^2$/day or less when measured according to ASTM F-1249-06 at a temperature of 38° C. and a relative humidity of 100%, and wherein the total amount of ethylene vinyl alcohol copolymer and polyamide in the multilayer film is less than 0.5 weight percent based on the total weight of the film.

6. The multilayer film of claim 5, wherein the multilayer film exhibits a total haze of 30% or less when measured according to ASTM 1003-07.

7. The multilayer film of claim 1, wherein the multilayer film comprises at least 15 weight percent of the polyethylene composition based on the total weight of the multilayer film.

8. The multilayer film of claim 1, wherein the multilayer film comprises at least 95% by weight polyethylene.

9. The multilayer film of claim 1, wherein the polyethylene composition is formed in the presence of a catalyst composition comprising a multi-metallic procatalyst via solution polymerization in at least one reactor.

10. The multilayer film of claim 9, wherein the solution polymerization occurs in a single reactor.

11. An article comprising a multilayer film according to claim 1.

* * * * *